United States Patent [19]

Momirov

[11] Patent Number: 4,847,830
[45] Date of Patent: Jul. 11, 1989

[54] METHOD AND APPARATUS FOR AUTOMATIC LOADING OF A DATA SET IN A NODE OF A COMMUNICATION NETWORK

[75] Inventor: Milan Momirov, San Mateo, Calif.

[73] Assignee: Network Equipment Technologies, Inc., Redwood City, Calif.

[21] Appl. No.: 127,798

[22] Filed: Dec. 2, 1987

[51] Int. Cl.⁴ .................... H04J 3/24; G05B 15/08; G05B 19/18
[52] U.S. Cl. .................... 370/94; 364/187; 364/131; 371/11
[58] Field of Search .............. 370/60, 85, 86, 88, 370/90, 92, 94, 96; 340/825.07, 825.08, 825.3, 825.52, 825.53, 825.54, 825.5; 364/131, 133, 184, 187; 371/7, 11, 12, 13

[56] References Cited

U.S. PATENT DOCUMENTS

| | | | |
|---|---|---|---|
| 4,532,594 | 7/1985 | Hosake et al. | 364/187 |
| 4,670,834 | 6/1987 | Byal | 364/131 |
| 4,709,325 | 11/1987 | Yajima | 371/11 |

Primary Examiner—Douglas W. Olms
Assistant Examiner—Wellington Chin
Attorney, Agent, or Firm—Fliesler, Dubb, Meyer & Lovejoy

[57] ABSTRACT

In a communication network, including a first node and a plurality of neighbor nodes that are linked by communication channels to the first node, a data set is retrieved from neighbor nodes according to the following process:

1. identifying the data set to be retrieved in the first node;
2. identifying neighbor nodes in the plurality that have a copy of the identified data set;
3. supplying requests for individual blocks in the data set across the communication channels essentially in parallel to the identified neighbor nodes;
4. receiving the individual blocks as the individual blocks are returned from the neighbor nodes; and
5. assemblying data set in the first node from the received individual blocks.

23 Claims, 3 Drawing Sheets

METHOD AND APPARATUS FOR AUTOMATIC LOADING OF A DATA SET IN A NODE OF A COMMUNICATION NETWORK

LIMITED COPYRIGHT WAIVER

A portion of this patent document, contains material to which a claim of copyright protection is made. The copyright owner has no objection to the facsimile reproduction by anyone of the patent document, or the patent disclosure as it appears in the U.S. Patent and Trademark Office patent file records, but reserves all other rights whatsoever.

BACKGROUND OF THE INVENTION

1. Field of the Invention

The present invention relates to communication networks, such as integrated digital networks, which include a plurality of switching nodes. More particularly, the present invention provides a method and apparatus for automatically loading data sets, such as system management software, to a given node in the network from neighbor nodes in the network.

2. Description of Related Art

Integrated digital networks, or other large communications systems, include a number of nodes at which calls and other data being transmitted through the network are routed. In modern systems, each node is a switching center that runs under individual network management software control. This network management software is a large data set that must be stored in non-volatile memories so that it is not lost when power goes down at a given node. Such large non-volatile memory can be quite expensive as compared with the overall cost of the switching node. Therefore, it is desirable to reduce the number of nodes in a given network system that are required to store the system management software, or other large data sets, without degrading the performance of the switches or the network. This can be accomplished by providing large dynamic random access memory which is much less expensive than the non-volatile storage on individual nodes and by loading the required system management software from neighbor nodes when the particular node is turned on. However, the loading of a large data set from a neighbor node can be time-consuming. Further, in large networks, several versions of a given system management software may exist. Therefore, when initializing a node that must load the system management software from a neighbor, care must be taken to retrieve the desired version of the system management software.

SUMMARY OF THE INVENTION

The present invention provides a method and apparatus for retrieving a data set to a first node in the network from a plurality of neighbor nodes with maximum efficiency.

The method according to the present invention, operates in a communication network, including a first node and a plurality of neighbor nodes that are linked by communication channels to the first node. The data set to be retrieved includes a number of blocks of data that can be individually retrieved. The method comprises the following steps:

1. identifying the data set to be retrieved in the first node;

2. identifying neighbor nodes in the plurality that have a copy of the identified data set;

3. supplying requests for individual blocks in the data set across the communication channels essentially in parallel to the identified neighbor nodes;

4. receiving the individual blocks as the individual blocks are returned from the neighbor nodes; and 5. assembling data set in the first node from the received individual blocks.

According to another aspect of the invention, a user-programmable resource is provided for specifying a desired version of the data set, and the method includes steps of reading the user-programmable resource, and if the user has specified a desired version, then selecting the desired version as the data set to be retrieved; and if the user has not specified a desired version, then determining a preferred version from among the versions in the neighbor nodes and selecting the preferred version as the data set to be retrieved.

The apparatus according to the present invention, is a node for the communication network comprising a plurality of ports coupled to the communication channels for porting the communications to and from the node. A storage element such as a PROM for storing node software is included. A memory for storing data for read and write access within the node and a processing unit for running the node functions, are provided. The processing means includes means for identifying the data set to be retrieved, means for identifying neighbor nodes having the identified data set and linked by working communication channels to the first node, and means for supplying requests for individual blocks of the data set to the plurality of identified neighbors essentially in parallel through the ports. Also, the processing means includes means for receiving the individual blocks through the ports as the individual blocks are returned from the neighbor nodes, and a means for assembling the data set in memory.

As can be seen, significant features of the present invention include the ability of an operator to specify a version of the data set that he desires to be loaded that is not necessarily a requirement; the ability of the node software to automatically select the latest code version; and the ability of the node software to load simultaneously from multiple neighbors to maximize throughput.

DESCRIPTION OF THE PREFERRED EMBODIMENT

Figure 1:
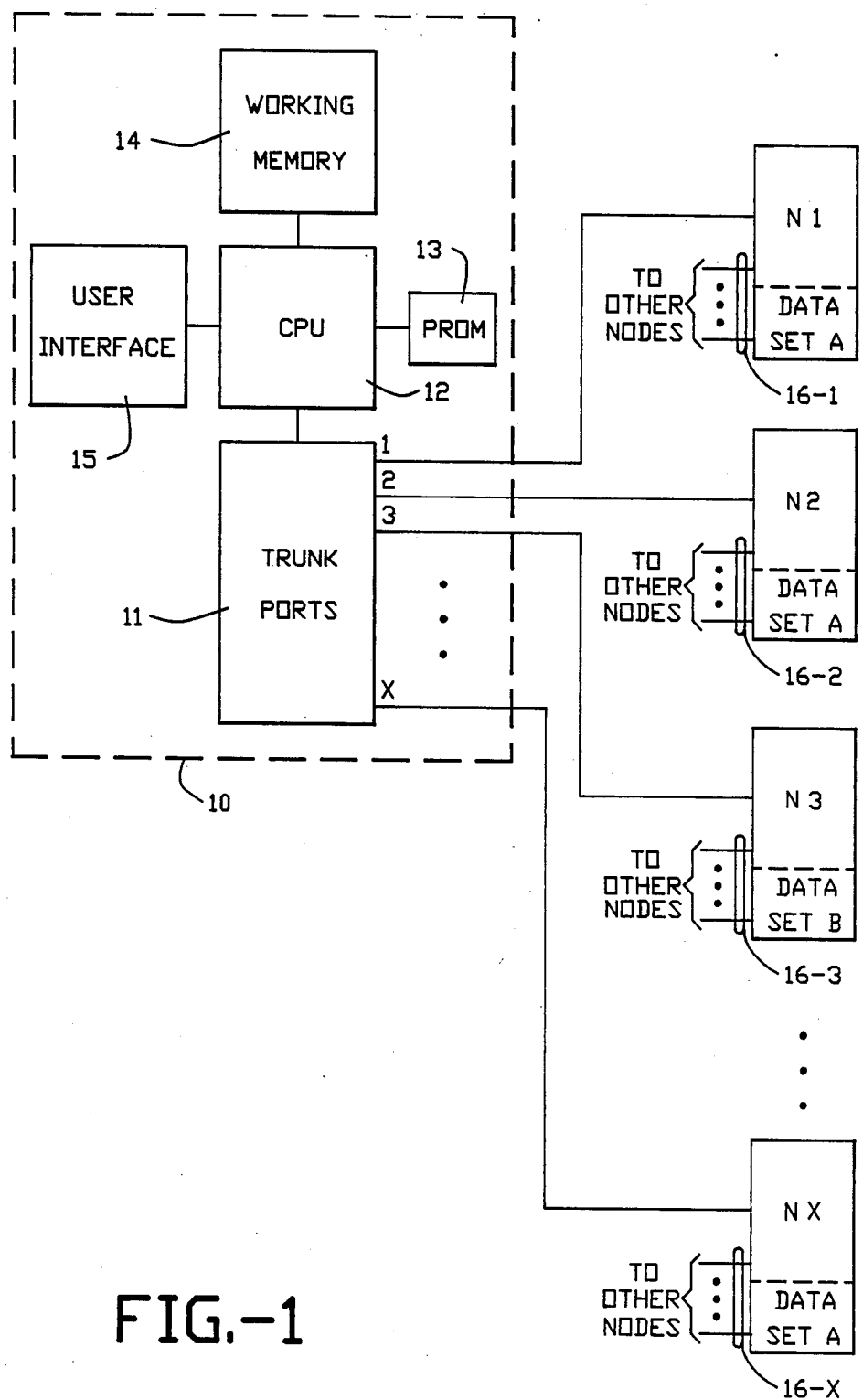
FIG. 1 is a block diagram of a communication network according to the present invention.
Figure 2:
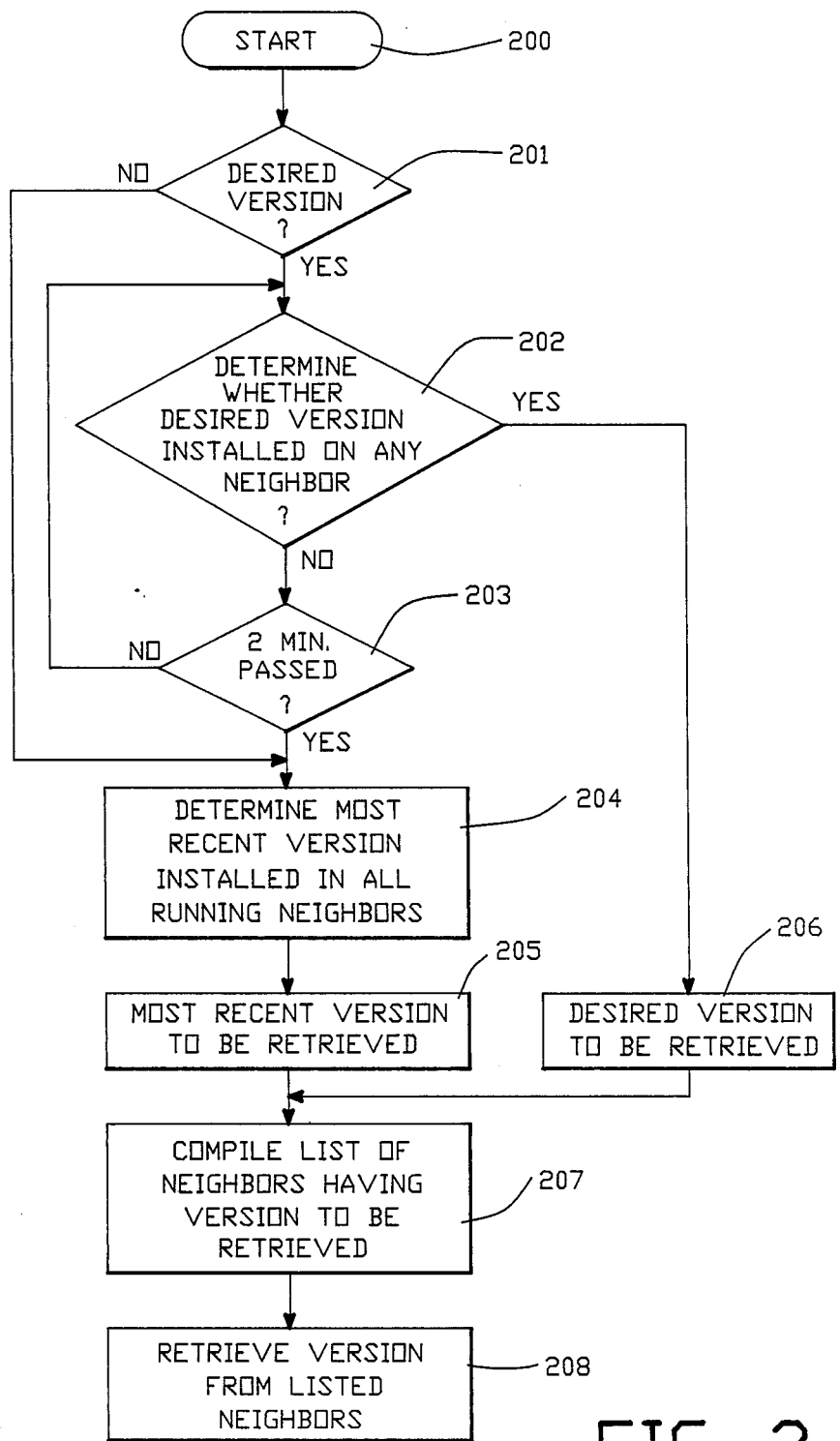
FIG. 2 is a flowchart of a first portion of the node software running the method according to the present invention.
Figure 3:
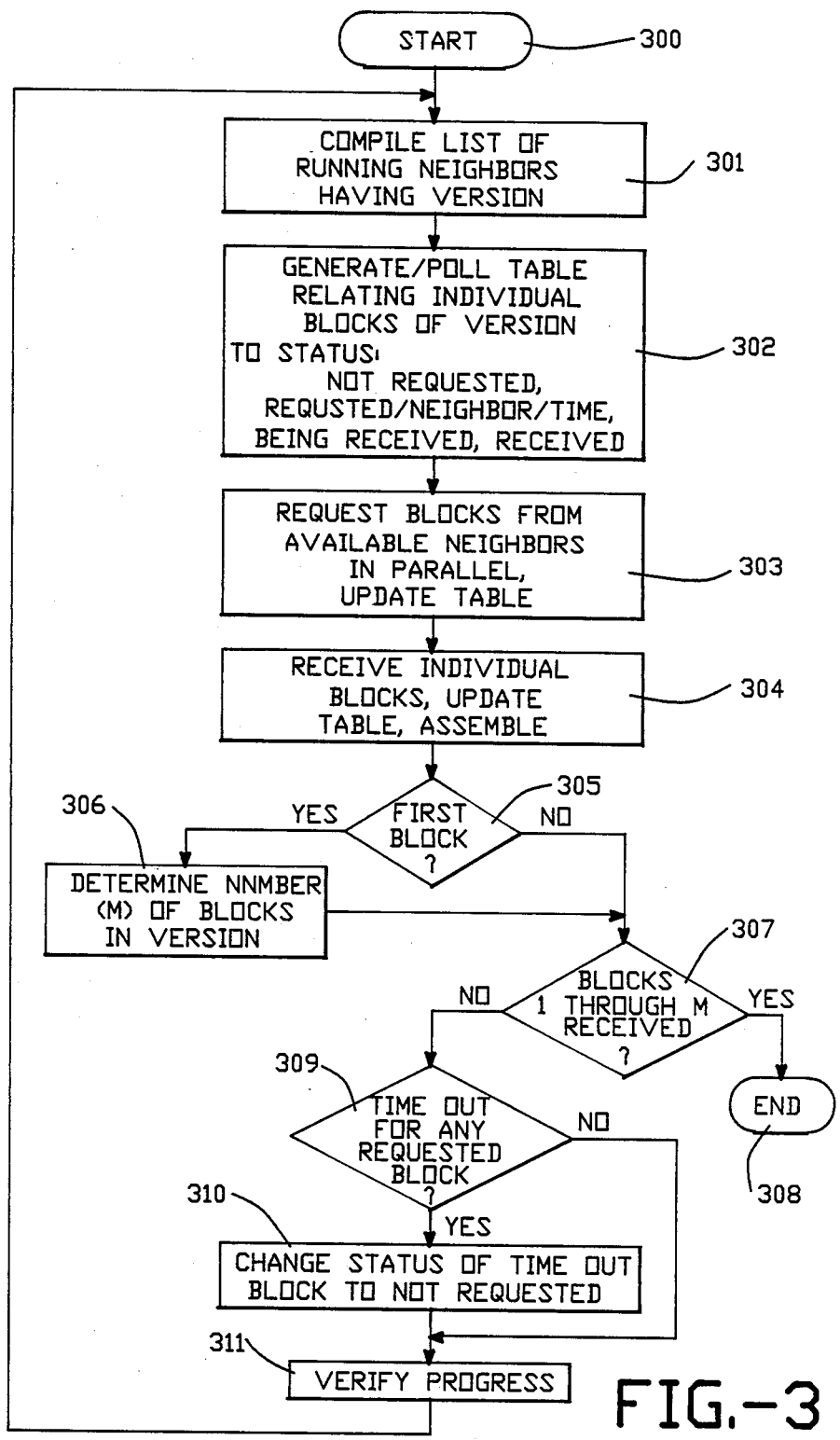
FIG. 3 is a second portion of the node software running the method according to the present invention.

A detailed description of the preferred embodiment is provided with reference to FIGS. 1-3. A communication network including a first node 10 and a plurality of neighbor nodes N1-NX is shown in FIG. 1. The processing method according to the present invention is shown in FIGS. 2 and 3.

The communication network shown in FIG. 1 includes a first node 10 which is connected by communication channels 1, 2, 3, . . . X, to a plurality of neighbor nodes N1, N2, N3, . . . NX. The communications channels 1, 2, 3, . . . X, are connected to the first node 10 through trunk ports 11. The node 10 also includes a central processing unit (CPU) 12, a non-volatile storage element such as PROM 13, a working memory 14 and a user interface 15.

The trunk ports provide a means for porting communications channels to the node 10. The PROM 13 provides a non-volatile storage for node software that is used to initialize nodes and to run the retrieval processes according to the present invention. The working memory 14 is a large dynamic RAM memory space that is used for working storage by the CPU 12. The user interface 15 is a means by which an operator can provide pre-specified information to the CPU 12. The CPU 12 is a processing means such as a microprocessor, that is adapted when it is turned on to load the node software from the PROM 13 and to run initializing functions. One of those initializing functions is the process of retrieving system management software, or other large data sets from neighbor nodes according to the present invention.

The neighbor nodes N1, N2, N3, . . . NX, are independent switching nodes in the communication network that are connected across a communication channel, preferably without an intervening switching node. Each of the nodes includes a data set. For instance, node N1 includes data set A, node N2 includes data set A, node N3 includes data set B, and node NX includes data set A. In the preferred embodiment, the data set A will be a most recent version of system management software while data set B will be an older version of the system management software. Other nodes in the network will include either data set A, data set B, or other versions of the system management software. In addition, the neighbor nodes N1–NX may be connected to other nodes in the network across communications channels 16-1, 16-2, 16-3, . . . 16-X.

The apparatus shown in FIG. 1 operates when the power is supplied to initialize the CPU 12. The CPU 12 is initialized by loading initializing software from the PROM 13 which brings the node 10 up and establishes links across the communications channels 1-X to the neighbor nodes N1-NX. The process of establishing links to the neighbor nodes involves processing a handshaking protocol between each individual neighbor node. As part of this handshaking protocol, network topology information is gathered by the first node 10 and stored in a network topology data base in the working memory 14. This network topology data base in the working memory 14 is utilized by the algorithm for retrieving the network management software from neighbor nodes as discussed below.

The user interface 15 can be used by an operator of the system to load pre-specified data for use by the CPU 12. For instance, as is described below, the user interface 15 is used in the algorithm of the present invention to provide a means by which the operator can specify a desired version of the system management software to be retrieved to the node 10.

The network topology database is maintained, such that if any neighbor node goes out of service, the topology database is updated to reflect that fact. Further, when a neighbor node is updated by receiving a different version of the data set, that fact is also communicated and stored in the topology database.

FIG. 2 shows the method for retrieving a desired version of the data set from the neighbor nodes. After the node 10 has established links to all working neighbors of the node, the retrieval algorithm starts at block 200. Then, the processor determines whether the user has specified a desired version of the data set (block 201). If a desired version is specified, then the processing means determines from the topology database whether any neighbor has the desired version installed (block 202). If it does not find a neighbor having the desired version, then the algorithm enters a loop by which it waits two minutes in order to allow a link to be established to a neighbor with the desired version (block 203). Therefore, after block 203, if two minutes have not passed, the algorithm loops back to block 202.

When the two minutes have elapsed, if the desired version is not installed on any neighbor, or if it is determined in block 201 that the user did not specify a desired version, then the algorithm determines the most recent version of the data set that is installed on all running neighbors (block 204). From the process in block 204, the most recent version of the data set is identified as the one to be retrieved (block 205). If it is determined that the desired version from block 202 is installed on at least one neighbor, then the desired version is identified as the version to be retrieved (block 206).

From block 205 or block 206, the algorithm proceeds to compile a list of all neighbors that have the version to be retrieved installed (block 207). Then, the identified version is retrieved by requesting individual blocks of the data set from all of the listed neighbors.

In the preferred system, the data set to be downloaded consists of a set of blocks, each having 32 kilobytes of data when full. Each block includes a header field that stores information characterizing the data set.

If only one neighbor is identified as having the desired version, then the algorithm sends a single request to the identified neighbor for one 32-kilobyte block. When the requested block has been delivered and verified, the task requests the next block and so on.

However, in order to minimize the download time, the algorithm according to the present invention, loads simultaneously blocks of data from all of its neighbors that have the desired version. The algorithm for accomplishing this essentially parallel loading of the data set from a plurality of neighbors is illustrated in FIG. 3.

The flowchart in FIG. 3 starts after the version of the data set that is to be retrieved is identified as shown in FIG. 2 (block 300). The first step is to compile a list of the running neighbors that have the identified version (block 301). This is accomplished by reviewing the topology database from the working memory. Next, the algorithm generates a table that relates individual blocks of the version to a status of either "not requested," "requested" from a given neighbor with a time stamp, or "received" (block 302). Next, requests are supplied across communications channels for individual blocks from all of the available neighbors in parallel and the table is updated (block 303).

As the individual blocks are received, the table is updated and the data is assembled in the working memory (block 304).

As blocks are received, the algorithm determines whether the block is the first one to be returned (block 305). If it is the first block, then the number M of blocks in the version is determined from the header field of that first block (block 306).

If the block received is not the first block or after determining the number M in block 306, the algorithm determines whether blocks 1 through M are in the "received" state (block 307). If all the blocks are "received," the algorithm ends (block 308). If all the blocks are not "received," then the table is reviewed to determine whether a time-out has occurred for any block in the "requested state" (block 309). If a time-out has occurred, then the status of that block is changed to "not requested" (block 310). If there are no time-outs or after changing the status of the time-out block in block 310, the algorithm then verifies progress of the retrieval (block 311), and returns to block 301. In the second and subsequent passes through block 302, the table is polled to identify blocks that are in the "not requested" state and neighbors that are not related to a "requested" block. Based on that information, requests for blocks are made to all available neighbors in parallel once again as in block 303, and the algorithm continues.

The step of receiving individual blocks is placed at the location 304 in the flowchart of FIG. 3 for simplicity. It should be understood that blocks are received randomly based on the time it takes for a communication to occur between the node and a given neighbor. Further, the order of the events in this algorithm may take a variety of sequences depending on the manner in which blocks are returned from neighbor nodes.

It can be seen that the present invention minimized the download time for a large data set to a given node in a communication network by generating requests essentially in parallel to all neighbor nodes that have the desired data set. These requests may in fact be generated in a serial manner; that is, across a first channel, then across a second channel, then across a third channel to respective first, second and third neighbors, but occur essentially in parallel because the time required for the request/return sequence to complete is much greater than the time required to generate the request in the node. Therefore, at a given time, there are a number of requests/return sequences operating simultaneously in the system.

A submission of a computer software program listing which encodes key portions of an embodiment of the present invention is provided under 37 C.F.R. §1.96(a)(2)(ii), following the text of this specification, to teach a preferred implementation to those skilled in the art.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

I claim:

1. In a communications network including a first node and plurality of neighbor nodes linked by communications channels to the first node, a method for retrieving a data set including a number M blocks of data to the first node from the plurality of neighbor nodes comprising:
   identifying the data set to be retrieved in the first node;
   identifying neighbor nodes in the plurality that have a copy of the identified data set;
   supplying requests for individual blocks in the data set across communications channels essentially in parallel to the identified neighbor nodes;
   receiving the individual blocks as the individual blocks are returned from the neighbor nodes, and assembling the data set in the first node from the received individual blocks.

2. The method of claim 1, further including after receiving an individual block from a given neighbor:
   identifying blocks yet to be requested or received, if any; and
   supplying a request for a block yet to be requested or received to the given neighbor.

3. The method of claim 1, further including after receiving a plurality of individual blocks from given neighbors:
   identifying blocks yet to be requested or received, if any; and
   supplying requests for blocks yet to be requested or received in parallel to the given neighbors.

4. The method of claim 1, wherein the step of identifying the data set includes:
   providing a user-programmable resource for identifying the data set, and
   reading the user-programmable resource.

5. The method of claim 4, wherein the data set is a pre-specified facility having versions, and the data set is identified by version.

6. The method of claim 4, wherein the data set is a pre-specified facility having versions, and the data set is identified by version and the step of identifying the data set includes:
   providing a user-programmable resource for specifying a desired version,
   reading the user-programmable resource, and if the user has specified a desired version, then selecting the desired version as the data set to be retrieved, and
   if the user has not specified a desired version, then determining a preferred version from among the versions in the neighbor nodes and selecting the preferred version as the data set to be retrieved.

7. The method of claim 6, further including:
   if after selecting the desired version as the data set to be retrieved, no neighbors are identified having the desired version, then determining a preferred version from among the versions in the neighbor nodes and selecting the preferred version as the data set to be retrieved.

8. The method of claim 1, wherein the data set is a pre-specified facility having versions, and the data set is identified by version and the step of identifying the data set includes:
   determining a preferred version from among the versions in the neighbor nodes and selecting the preferred version as the data set to be retrieved.

9. The method of claim 1, wherein at least one individual block includes a header field indicating the number of blocks in the data set, and further including:
   determining the number of blocks in the data set to be requested from the header field in the at least one individual block after it is received.

10. The method of claim 1, further including:
    relating individual blocks in the data set to a status of "not requested," "requested from given neighbor," or "received"; and wherein
    the step of supplying requests is responsive to the status of individual blocks to supply requests for blocks having a status of "not requested" to respective available ones of the identified neighbors, available neighbors being neighbors having the identified data set and not related to blocks having a status of "requested from given neighbor."

11. The method of claim 10, wherein the step of relating includes indicating elapsed time since an individual block has been requested from a given neighbor, and the method further includes:

changing the status of blocks having "requested from given neighbor" status for which the elapsed time exceeds a threshold to "not requested."

12. The method of claim 10, wherein at least one individual block includes a header field indicating the number of blocks in the data set, and further including:

determining the number M of blocks in the data set to be requested from the header field in the at least one individual block after it is received; and detecting when the M blocks have the "received" status.

13. For a communications network including a first node and plurality of neighbor nodes linked by communications channels to the first node, an apparatus in the first node for retrieving a data set including a number M blocks of data to the first node from the plurality of neighbor nodes, comprising:

means for identifying the data set to be retrieved;

means, in communication with the means for identifying the data set, for identifying neighbor nodes in the plurality that have a copy of the identified data set;

means, in communication with the means for identifying neighbor nodes and coupled to the communications channels, for supplying requests for individual blocks in the data set across communications channels essentially in parallel to the identified neighbor nodes;

means, coupled to the communications channels, for receiving the individual blocks as the individual blocks are returned from the neighbor nodes; and means, in communication with the means for receiving, for assembling the data set in the first node from the received individual blocks.

14. For a communications network including a first node and a plurality of neighbor nodes linked by communications channels to the first node, an apparatus in the first node for retrieving a data set including a number M blocks of data to the first node from the plurality of neighbor nodes, comprising:

port means, coupled to the communications channels, for porting communications to and from the first node;

storage means for storing node software;

memory means for storing data for read and write access;

processing means, coupled to the storage means, to the memory means and to the port means and responsive to the node software, for running node functions, including means for identifying the data set to be retrieved, means for identifying neighbor nodes having the identified data set and linked by a working communications channel to the first node, means for supplying requests for individual blocks of the data set to a plurality of the identified neighbors essentially in parallel through the port means, means for receiving the individual blocks through the port means as the individual blocks are returned from the neighbor nodes, and means for assembling the data set in the memory mean from the received individual blocks.

15. The apparatus of claim 14, wherein the data set is a pre-specified facility having versions, and the data set is identified by version, further including:

user interface means, coupled to the processing means and the memory means, for supplying user-specified data to the memory means; and wherein the means for identifying the data set includes means for reading the user-specified data from the memory means, and if the user has specified a desired version, the selecting the desired version as the data set to be retrieved, and if the user has not specified a desired version, then determining a preferred version from among the versions in the neighbor nodes and selecting the preferred version as the data set to be retrieved.

16. The apparatus of claim 14, wherein the data set is a pre-specified facility having versions, and the data set is identified by version, wherein the means for identifying the data set to be retrieved includes:

means for determining a preferred version from among the versions in the neighbor nodes and selecting the preferred version as the data set to be retrieved.

17. The apparatus of claim 14, wherein the processing means further includes:

means for relating individual blocks in the data set to a status of "not requested," "requested from given neighbor," or "received"; and wherein the means for supplying requests is responsive to the means for relating to supply requests for blocks having a status of "not requested" to respective available neighbors of the identified neighbors, available neighbors being neighbors linked by a working communication channel to the first node, having the identified data set and not related to blocks having a status of "requested from given neighbor."

18. The apparatus of claim 17, wherein the means for relating including means for indicating elapsed time since an individual block has been requested from a given neighbor, and the processing means further includes:

means for changing the status of blocks "requested from given neighbor" for which the elapsed time exceeds a threshold to "not requested," and means for updating the identified neighbor nodes having the identified data set and linked by a working communications channel to the first node.

19. The apparatus of claim 17, wherein at least one individual block includes a header field indicating the number M of blocks in the data set, and the processing means further includes:

means for determining the number M of blocks in the data set to be requested from the header field in the at least one individual block after it is received; and means for detecting when the M blocks have the "received" status.

20. The apparatus of claim 14, wherein at least one individual block includes a header field indicating the number of blocks in the data set, and the processing means further includes:

means for determining the number of blocks in the data set to be requested from the header field in the at least one individual block after it is received.

21. The apparatus of claim 14, wherein the node software is adapted for initializing the node.

22. The apparatus of claim 15, wherein the node software is adapted for initializing the node and the prespecified facility is communication network management software.

23. The apparatus of claim 16, wherein the node software is adapted for initializing the node and the prespecified facility is communication network management software.

* * * * *